Sept. 20, 1971 R. L. WOOLLEY 3,605,406
COMBINED GAS AND STEAM POWER PLANT
Filed June 27, 1969 3 Sheets-Sheet 1

Raymond L. Woolley
INVENTOR.

BY *Clarence A. O'Brien*
and *Harvey B. Jacobson*
Attorneys

Sept. 20, 1971  R. L. WOOLLEY  3,605,406
COMBINED GAS AND STEAM POWER PLANT
Filed June 27, 1969  3 Sheets-Sheet 2
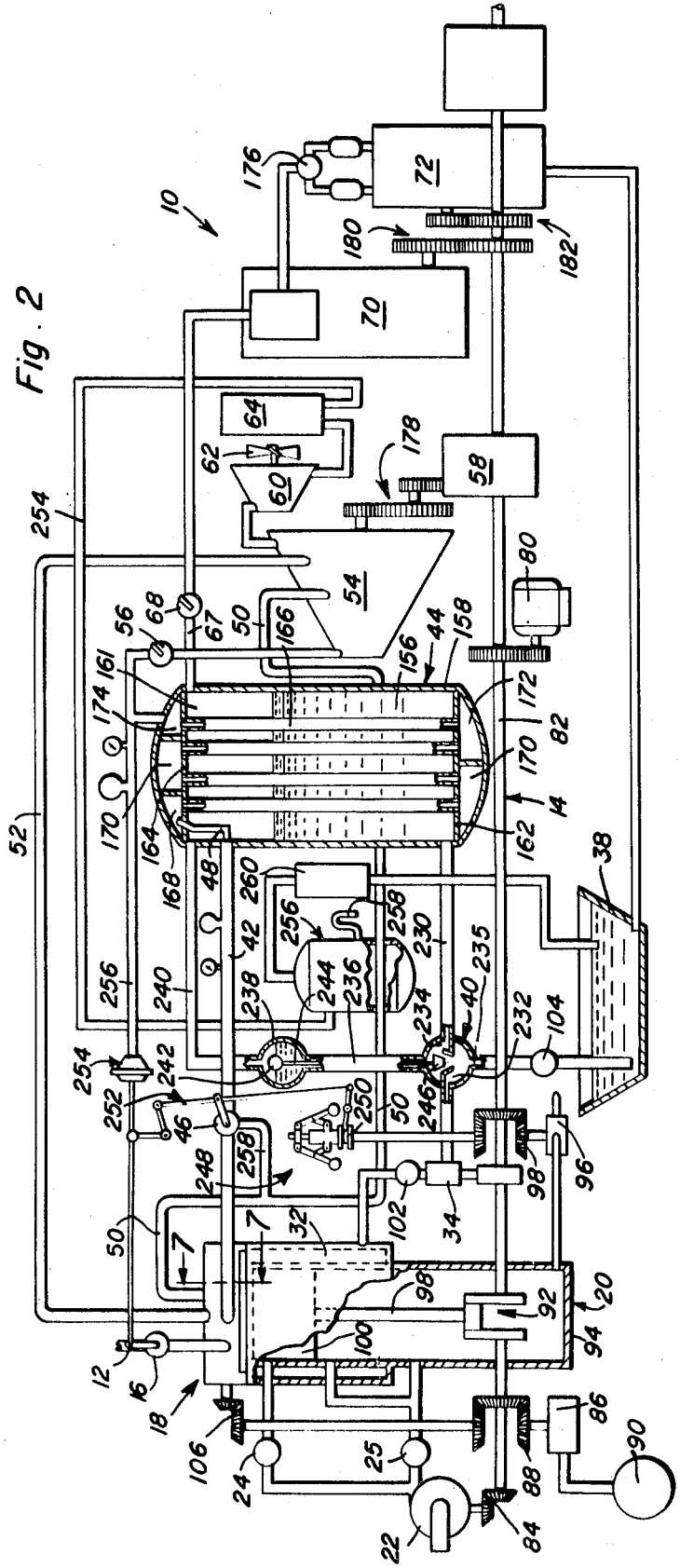
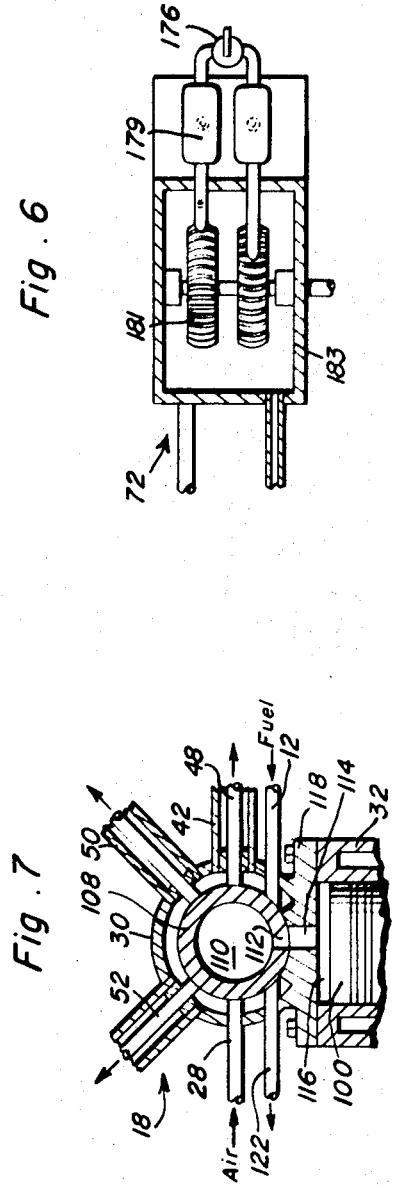
Raymond L. Woolley
INVENTOR.
BY *Clarence A. O'Brien*
and *Harvey B. Jacobson*
Attorneys Sept. 20, 1971　　　　　　　　R. L. WOOLLEY　　　　　　　　3,605,406
COMBINED GAS AND STEAM POWER PLANT
Filed June 27, 1969　　　　　　　　　　　　　　　　3 Sheets-Sheet 3

Raymond R. Woolley
INVENTOR

BY Clarence A. O'Brien
and Harvey B. Jackson
Attorneys

United States Patent Office 3,605,406
Patented Sept. 20, 1971

3,605,406
COMBINED GAS AND STEAM POWER PLANT
Raymond L. Woolley, 466 Magnolia Ave.,
Yuma, Ariz. 85364
Filed June 27, 1969, Ser. No. 837,283
Int. Cl. F02c *1/04, 5/08, 5/12*
U.S. Cl. 60—39.18B
15 Claims

ABSTRACT OF THE DISCLOSURE

A combustion fuel type of gas generator sequentially supplies hot, pressurized gases to various stages of a gas turbine through separate flow paths, one of which passes in heat exchange relation to water stored in a heat exchanger. The water is circulated by a turbine driven pump through cooling jackets surrounding the gas generator and a reciprocating compressor supplying pressurized air thereto. Superheated steam from the heat exchanger is conducted in series through a reciprocating steam engine and a reversible steam and water jet turbine to augment the power output of the gas turbine.

---

This invention relates to a power plant or power generating system employing different types of engines including turbine and reciprocating piston types in combination with cooperating equipment such as air compressors, heat exchangers, combustion gas generators and reversible fluid drive mechanisms.

In regard to the conversion of the internal energy of fuels into mechanical energy, a considerable amount of effort has been expended and proposals made for improving the efficiency of such energy conversion as well as to more completely and conveniently utilize the energy released from the fuel. Power plants utilizing a combination of different types of prime movers in order to make available the advantages of each, have heretofore been proposed such as disclosed in my prior U.S. Pat. No. 2,357,041. An important object of the present invention therefore resides in a further development and advancement over the basic proposals set forth in my prior patent.

Thus, the present invention involves a unique and novel arrangement of different types of prime movers and supporting equipment designed to efficiently convert and more propitiously utilize energy released from a fuel such as diesel fuel.

In accordance with the present invention, a multistage gas turbine is utilized as the main prime mover to which gas is supplied from a fuel combustion type of gas generator. The gas generator is driven from the output of the main gas turbine so as to sequentially supply gas to the various stages of the turbine and to a heat exchanger within which water is superheated and from which the superheated steam is conducted in series through a reciprocating type of steam engine and a steam and water jet turbine. The reciprocating steam engine and the jet turbine are drivingly connected to a mechanical load in parallel with the output of the gas turbine through a suitable transmission such as a hydraulic torque converter or a plural change speed gear drive. The main multistage gas turbine may be drivingly connected to the common load through a reversible fluid drive and fluid jet turbine so as to regulate the power output of the power plant as well as to provide for hydrodynamic braking. Further, the energy released from combustion of the fuel may be utilized for purposes other than the drive of prime movers such as space heating, distillation, and air conditioning.

The power plant of the present invention in addition to combining the advantages of steam and internal combustion engines, reduces heat losses, reduces pollution by more complete combustion of the fuel, stores power to prevent stall, prevents backfire, prevents fuel carburetor flooding by use of a fuel injection system, avoids distributor trouble by utilizing a compression ignition method of combustion, eliminates the need for mufflers and by use of diesel fuel avoids vapor lock and fire hazards. Regulation of the power generated by the power plant is also facilitated by use of a reversible fluid drive and a reversible type of jet turbine making available variable, non-friction braking of the output power drive train. Starting of the engine is also facilitated under the joint control of speed and pressure responsive devices which also operate as a safety feature to automatically shut-off the fuel and stop operation when the speed becomes excessive or the products of combustion reach an upper pressure limit. The power plant also embodies features which tend to reduce wear and thereby prolong its useful life comparable with that of steam locomotive engines without the disadvantages and drawbacks thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a schematic illustration of the power plant with the various components diagrammatically shown in functionally related relation to each other.

FIG. 6 is a top sectional view taken substantially through a plane indicated by section line 6—6 in FIG. 5.

FIG. 7 is an enlarged partial sectional view taken substantially through a plane indicated by section line 7—7 in FIG. 2 showing the fuel combustion gas generator utilized therein.

Figure 1:
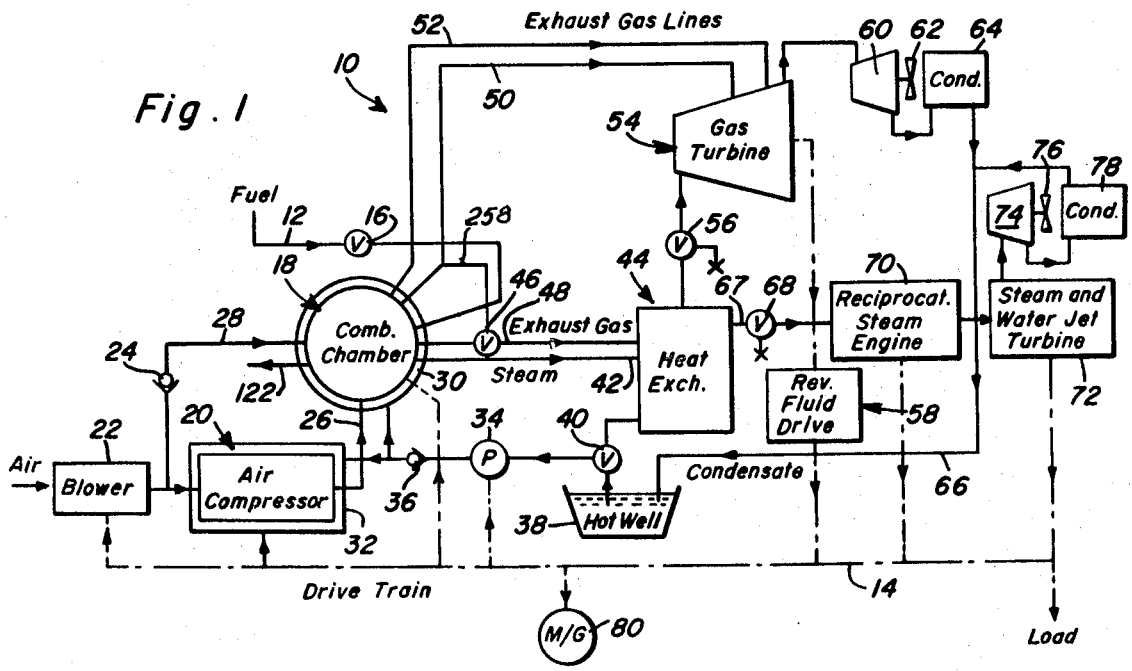
FIG. 1 is a block diagram illustrating the basic arrangement of components associated with the power plant of the present invention.

Referring now to the drawings in detail, and initially to FIG. 1, a power plant generally referred to by reference numeral 10 as its primary function converts the energy stored in a fuel such as diesel fuel conducted to the power plant through supply conduit 12, into mechanical energy which is transmitted to a load by a common drive train 14. The fuel in conduit 12 is admitted through a fuel cut-off valve 16 to a gas generator 18 driven from the output drive 14. Air under pressure is supplied to the gas generator from an output driven air compressor 20 and from a blower 22 through check valve 24 under starting conditions. Thus, the fuel injected into the combustion chamber associated with the gas generator 18 is mixed with pressurized air supplied thereto through conduits 26 or 28 to form a combustible mixture that is periodically ignited by the compression of the air supplied to the combustion chamber to cyclically produce gas or combustion products under high pressure and velocity. The heat generated by operation of the gas generator 18 and air compressor 20, is removed by means of a coolant circulated through cooling jackets 30 and 32 surrounding the gas generator and air compressor. The coolant which may be in the form of water is supplied to the cooling jackets 30 and 32 by an output driven pump 34 through a check valve 36, the pump either recirculating the water or drawing the water from a hot well 38 through valve mechanism 40. The vaporized coolant or steam is conducted from the cooling jacket by conduit 42 to a heat exchanger 44 within which a body of water and steam is stored for heat exchange with exhaust gas combustion products supplied thereto through valve mechanism 46 and conduit 48 from the combustion chamber of the gas generator 18 which also sequentially and directly supplies exhaust gas through conduits 50 and 52 to a multistage gas turbine 54. Exhaust gas is also indirectly supplied to the turbine from the heat exchanger 44 through throttle valve 56.

The gas turbine 54 constitutes the main prime mover of the power plant having an initial stage to which exhaust gas is supplied under steady state conditions indirectly from the gas generator 18 through the heat exchanger 44 and subsequent stages directly supplied from the gas generator through conduits 50 and 52. The mechanical output of the gas turbine 54 is transmitted to the output drive train 14 through a reversible fluid drive component 58. The residual energy in the gases exiting from the main turbine 54 are conducted through an auxiliary turbine 60 to operate a cooling fan 62 for condenser 64 from which condensate is conducted by the conduit 66 to the hot well reservoir 38.

The exhaust gas from the gas generator 18 conducted through the heat exchanger 44, is operative to superheat the body of steam collected therein. This superheated steam is controllably fed from outlet 67 through a throttle valve mechanism 68 to a reciprocating type of steam engine 70 drivingly connected to the output drive train 14. The steam after exiting the steam engine 70, is conducted through a steam and water jet turbine 72 which is also drivingly connected to the output drive train. The residual energy of the steam and water exiting from the turbine 72, is conducted through an auxiliary turbine 74 operating a blower 76 to cool a condenser 78 from which condensate is conducted to the condensate conduit 66. Thus, the steam or vapor operated engines 70 and 72 increase, augment and/or regulate the mechanical power output of the power plant which drives a load connected to the output drive train 14 and also drives the water coolant pump 34, the air compressor 20 and the blower 22 as well as other peripheral equipment such as the motor generator unit 80 through which the power plant may be started and by means of which electrical energy may be stored by charging of a set of batteries (not shown).

Referring now to FIG. 2, it will be noted in one embodiment of the invention that the output drive train includes a common shaft 82 to which the various components of the power plant are geared. Thus, the pre-compressor or supercharger blower 22 is shown geared to one end of the shaft 82 through gearing 84. Another compressor 86 may be geared to the shaft by gearing 88 in order to store air under pressure within a tank 90 for operating compressed air operated equipment such as tire inflating devices, windshield wipers, spraying and painting devices, etc. The air under pressure from the blower 22 on the other hand is supplied through check valves 24 and 25 to various locations in the air compressor 20 which is of the reciprocating piston type. The air compressor 20 includes a crank assembly 92 connected to the output shaft 82 within the compressor housing 94 for which crankcase lubrication is provided by the oil pump 96 driven from the common output shaft through gearing 98. The crank assembly is connected through the piston rod 98 to the piston 100 reciprocated within a portion of the housing 20 surrounded by the cooling jacket 32 to which coolant or water is supplied by the pump 34 through the check valve 36. The pump draws the coolant or water from the hot well 38 through a check valve 104 and the valve mechanism 40. The coolant water is alternatively circulated between the cooling jackets 30 and 32 and the heat exchanger 44 under control of the valve mechanism 40 as explained hereafter.

In one form of the invention, the gas generator 18 includes a cylindrical member 108 as shown in FIG. 7 which is continuously rotated through gearing 106 and encloses therewithin a combustion chamber 110. The cylindrical member 108 includes a port 112 which is sequentially exposed to a plurality of stationary ports associated with the fuel supply conduit 12, and exhaust gas conduits 48, 50 and 52 through which combustion products are supplied to the heat exchanger 44 and the various stages of the gas turbine 54 as aforementioned. Air under pressure is supplied to the combustion chamber within the cylindrical member 108 when its port 112 is aligned with the air supply passage 114 periodically establishing fluid communication between the combustion chamber 110 and the compression chamber 116 within the air compressor 20 through the cylinder head 118 on which the gas generator is mounted. Air intake and outlet ports 28 and 122 are also associated with the gas generator as shown in FIG. 7 so as to draw in a charge of air from blower 22 and exhaust residual gases for scavenging purposes. It will therefore be apparent that the cylindrical member 108 is rotated in a counterclockwise direction as viewed in FIG. 7 at a proper speed synchronized with the reciprocatory movement of the compressor piston 100 so as to periodically receive its charge of air under an ignition compression pressure in the position of the cylindrical member and the compressor piston as shown in FIG. 7. As the port 112 becomes aligned with the inlet port from the fuel supply conduit 12, a charge of fuel is received for mixing with the charge of air causing ignition in view of its temperature and pressure. The products of combustion are then initially discharged through the conduit 48 to the heat exchanger 44 followed by sequential discharge through the ports associated with the conduits 50 and 52 conducting the exhaust gas to the various stages of the main gas turbine 54. Finally, residual gases are scavenged as the port 112 is sequentially exposed to the conduits 28 and 122 to complete a cycle.

Figures 3, 4:
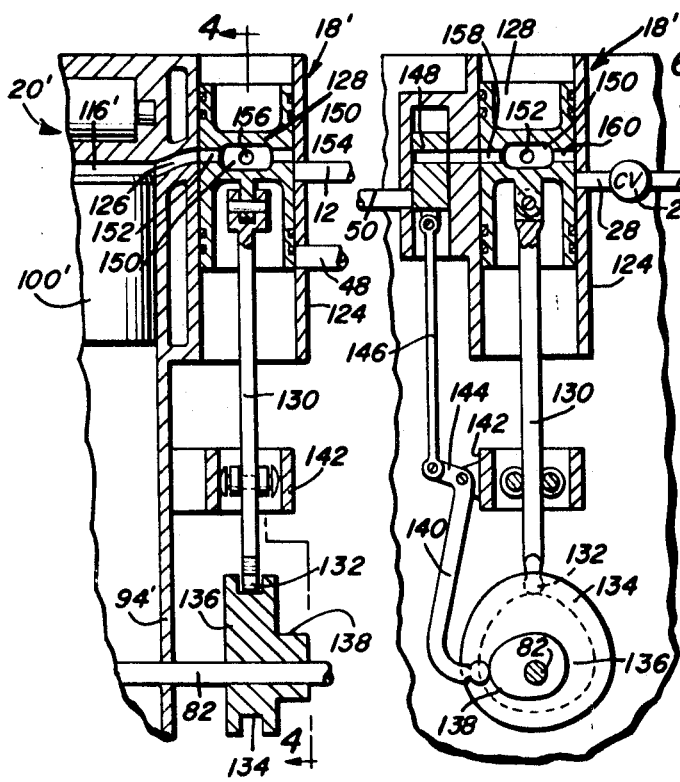
FIG. 3 is a partial side sectional view through a preferred form of combustion fuel gas generator utilized with the power plant of the present invention.
FIG. 4 is a sectional view taken substantially through a plane indicated by section line 4—4 in FIG. 3.

A preferred form of gas generator 18' is shown in FIGS. 3 and 4. The gas generator 18' is of the reciprocating piston type and includes a cylindrical housing 124 fixedly mounted on the housing 94' associated with an air compressor 20' similar to compressor 20 appropriately modified for cooperation with the reciprocating type of gas generator 18'. Thus, the air compressor 20' includes a compression chamber 116' located on one side of the piston 100 for communication with the cylinder 124 through a passage 126. A piston member 128 is reciprocably mounted within the cylinder 124 and is pivotally connected to a follower rod 130 having a follower end portion 132 engaged with the grooved contour portion 134 of a radial cam 136 connected to the output shaft 82. Thus, the piston member 128 is reciprocated in proper timed and phased relation to the reciprocation of the air compressor piston 100'. A second cam contour portion 138 is formed on the cam member 136 for engagement with the end of a follower lever element 140 pivotally mounted on the bracket 142 through which the follower rod 130 is guided for reciprocatory movement. The follower lever element 140 is provided with an arm 144 pivotally connected through a connecting rod 146 to a valve member 148. The valve member 148 is thus also reciprocated in proper phase relation to the reciprocatory movement of the piston member 128.

The piston member 128 encloses a combustion chamber cavity 150 having ports 152, 154, 156, 158 and 160 in communication therewith as shown in FIGS. 3 and 4. In the upper position of the air compressor piston 100' as shown in FIG. 3, compression chamber 116 is in communication with the combustion cavity 150 through passage 126 and port 152 so as to supply a charge of air under ignition pressure to the combustion cavity. As the piston member 128 moves downwardly from the position illustrated in FIGS. 3 and 4, initially, fluid communication is established between the combustion cavity 150 and the fuel supply line 12 as the air supply port 152 is cut off from the passage 126. Combustion then occurs within the combustion cavity because of the injection of the fuel. As the piston member 128 reaches the lower end of its reciprocatory movement, port 154 establishes communication between the combustion cavity and the port associated with conduit 48 so that the combustion products are initially supplied to the heat exchanger 44 as hereinbefore described. During the descent of the piston member 128, check valve 24 is closed to prevent supply of air from the blower 22 while the valve member 148 blocks communication between the turbine supply conduits and the port 158. During the upstroke of the piston member 128 however, the cam portion 138 causes positioning of the valve member 148 to sequentially establish communication between the turbine and the port 158 through conduit 50 for example so as to supply exhaust gas to the turbine causing a reduction in pressure within the combustion cavity 150. The check valve 24 may then open to establish fluid communication between the port 160 and the conduit 28 during the upstroke of the piston 128. The combustion chamber may then be scavenged by the air supplied thereto from the blower 22 to complete an operating cycle as the piston 128 approaches its upper limit position as shown in FIGS. 3 and 4.

With reference to the heat exchanger 44 shown in FIG. 2, a body of water 156 in a liquid state is stored within a vertical tank 158 which also encloses a steam collecting space 161 above the body of water. The water and steam is stored between lower and upper end walls 162 and 164 which support a plurality of heat transfer gas tubes 166. The end walls also separate the water and steam from gas chambers formed at the upper and lower ends of the tank. The gas chambers at the upper and lower ends are partitioned into separate gas spaces including an inlet gas chamber 168 formed at the upper end of the tank into which exhaust gas is fed by the conduit 48. The gas is therefore conducted from the inlet chamber 168 through one bank of heat transfer tubes 166 to a gas chamber 170 at the lower end of the tank from which the gas is conducted upwardly through another bank of heat transfer tubes 166 to the intermediate gas chamber 170 at the upper end of the tank. From the gas chamber 170, the gas is again conducted downwardly through another bank of heat transfer tubes to the second gas chamber 172 at the lower end of the tank from which the gas is finally conducted upwardly through a third bank of heat transfer tubes to the outlet gas chamber 174 at the upper end of the tank. Thus, the exhaust gas originating from the gas generator 18 or 18′, is conducted several times in heat exchange relation to the body of water 156 and steam within space 161 so as to continuously vaporize the water and superheat the steam between the end walls 162 and 164. After releasing a substantial amount of its heat energy, the exhaust gas is conducted from the outlet chamber 174 through throttle valve 56 to an initial stage of the multistage gas turbine 54. Exhaust gas is ordinarily conducted to the second stage of the turbine by the conduit 50 while the third stage of the turbine in the embodiment illustrated is supplied with gas from the gas generator by the conduit 52. It should of course be appreciated that the number of turbine stages and gas supply conduits may be varied.

Superheated steam adjacent the upper end of the steam space 161 within the heat exchanger 44, is conducted by outlet 67 through throttle valve 68 to the reciprocating steam engine 70 of conventional design from which the steam emerges and is conducted through a reverse drive control valve 176 to the steam and water jet turbine 72. Thus, torque is transmitted to the common output shaft 82 from the main gas turbine 54 through gearing 178 and the reversible fluid drive component 58, from the reciprocating steam engine 70 through the gearing 180 and from the steam and water jet turbine 72 through the gearing 182. Drive may be effected in either a forward or reverse direction by controlling the reversible fluid drive component 58 and operation of the steam and water jet turbine 72 through the reverse control valve 176.

Figure 5:
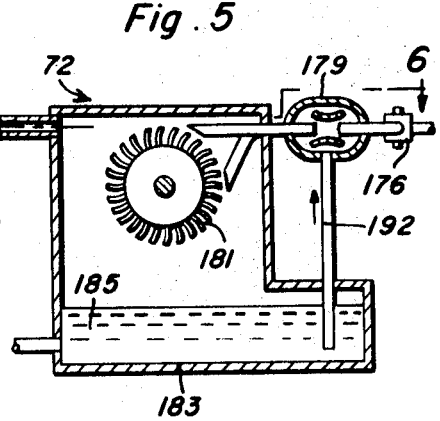
FIG. 5 is a side sectional view through the steam and water jet turbine associated with the power plant of the present invention.

Referring to FIGS. 5 and 6 in regard to the steam and water jet turbine 72, steam emerging from the reciprocating steam engine 70 is conducted through valve 176 to one of two venturi nozzle devices 179 from which the steam is tangentially discharged into the peripheral vanes of a pair of turbine wheels 181 connected in common to an output shaft driving the gearing 182 as aforementioned. The turbine wheels 181 are enclosed within a housing 183 storing a body of liquid water 185. A suction tube 187 extends from the body of water upwardly into the venturi nozzle devices 179 so that a mixture of steam and water will impinge upon either one of the turbine wheels 181. Thus, by means of the control valve 176, the direction of drive may be selected to either reverse the drive of the turbine or provide hydrodynamic braking.

Figure 8:
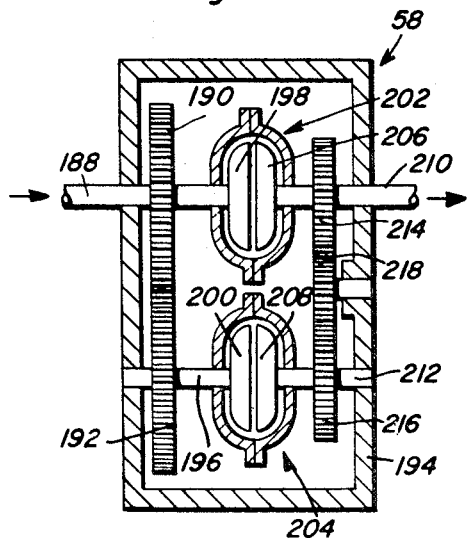
FIG. 8 is a sectional view through a reversible fluid drive utilized with the power plant.
Figure 9:
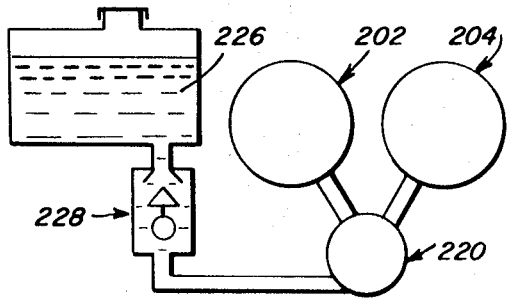
FIGS. 9 and 10 are diagrammatic illustrations of the control system associated with the reversible fluid drive shown in FIG. 8.
Figure 10:
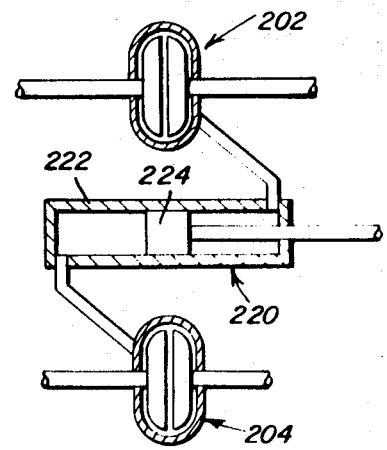

Forward and reverse drive of the common output shaft 82 from the main gas turbine 54 is selected through the reversible fluid drive component 58. As shown in FIG. 8, the input to the reversible fluid drive component is transmitted from the gas turbine to input shaft 188 which is drivingly connected through the constant mesh gears 190 and 192 within the housing 194 to a countershaft 196. The input shaft 188 and the countershaft 196 are connected to impeller elements 198 and 200 associated with fluid couplings 202 and 204 respectively. These fluid couplings include driven elements 206 and 208 respectively connected by shafts 210 and 212 to gear members 214 and 216 which are drivingly interconnected by means of the idler gear 218. The shaft 210 constitutes the output shaft of the reversible fluid drive component and it is either driven in the same direction as the input shaft 188 through the fluid coupling 202 or in a reverse direction through fluid coupling 204 and gears 192, 216, 218 and 214. One of the fluid couplings is therefore rendered operative while the other inoperative in order to control the direction of drive. Toward this end, hydraulic fluid is displaced from one fluid coupling to the other by means of a piston device 220 as shown in FIGS. 9 and 10. This piston device includes a fluid cylinder 222 through which hydraulic fluid is displaced by a piston 224 into one of the fluid couplings as it withdraws fluid from the other fluid coupling by compressing the chamber on one side of the piston as the chamber on the other side is expanded. Loss of hydraulic fluid is made up by supply from a fluid reservoir 226 connected to the piston device 220 through a float valve mechanism 228. Thus, as the piston 224 is displaced in one direction, it forces the hydraulic fluid from the contracting chamber into one of the fluid couplings and expands the other chamber to withdraw fluid from the other fluid coupling. When the piston reaches one end of its stroke, the fluid drive component 58 will be in an operative condition to transmit drive in one direction whereas displacement of the piston to the other end of its stroke will condition the fluid drive component for transmission of torque in the opposite direction. The fluid drive component 58 may therefore be utilized to control the direction of drive as well as for hydrodynamic braking purposes by reversing the drive in order to reduce the forward speed of the power plant.

As hereinbefore indicated, the cooling jackets 30 and 32 associated with the gas generator and the reciprocating compressor, are maintained filled with a coolant such as water drawn from the hot well 38 by the pump 34 through the check valve 104 and the valve mechanism 40. The coolant when heated is conducted by the conduit 42 to the steam space 161 within the heat exchanger so that when it enters the steam space, it flashes into steam and is then superheated by heat exchange with the gas conducted through the heat transfer tubes 166. Water from the hot well 38 is also supplied through the valve mechanism 40 to the lower end of the heat exchanger by means of conduit 230 as shown in FIG. 2 in order to maintain a certain level of water within the heat exchanger tank. The valve mechanism 40 therefore includes a pair of ports 232 and 234 respectively communicating with the intake of the pump 34 and the conduit 230. Port 234 maintains continuous fluid communication between the tank 158 and a tube 236 partially filling a chamber 238 vented to the steam space 161 in the heat exchanger through the conduit 240. The water within the chamber 238 will therefore assume a level equal to that of the level of water 156 within the heat exchanger tank 158 and thereby control the position of a float element 242 connected by a valve stem 244 to a valve element 246 within the valve mechanism 40. When the valve element 246 is in the open position illustrated in FIG. 2, fluid communication between ports 232 and 234 is established to permit circulation of coolant between the heat exchanger tank and the cooling jackets 30 and 32 since the suction of the pump 34 will then draw water from the tank through conduit 230 and force it through the cooling jackets into the conduit 42 through which it is returned to the heat exchanger tank. When the level of the water within the heat exchanger tank drops below a lower limit, the float element 242 moves downwardly closing the valve element 246. When the valve element 246 is closed, fluid communication between the ports 232 and 234 is blocked so that water is then drawn from the hot well 28 through port 235 as circulation between the cooling jackets and the heat exchanger tank is interrupted. Additional water is then drawn into the cooling system from the hot well, through check valve 104. When the level of the water within the heat exchanger tank is restored, the valve element 246 is opened by the float element 242 so that circulation of the water may be reinstituted and the check valve 104 closes.

As shown in FIG. 2, a centrifugal, fly ball governor type of speed sensing mechanism 248 is geared to the common output shaft 82 and is operative through a shiftable collar 250 to control the fuel cut-off valve 16 through the linkage 252. The linkage is also connected to a pressure sensing diaphragm device 254 exposed by conduit 256 to the static pressure of the exhaust gas exiting from the outlet chamber 174 of the heat exchanger. Thus, when the speed of the output shaft or the pressure of the exhaust gas becomes excessive, the supply of fuel through the supply conduit 12 is cut-off by the valve 16 under the joint control of the speed sensing device 248 and the pressure sensing device 254.

The linkage 252 which interconnects the speed sensing and pressure sensing devices with the fuel cut-off valve 16, is also connected to the valve 46 by means of which exhaust gas conducted to the initial stage of the turbine 54 indirectly through the heat exchanger 44, may be routed through by-pass conduit 258 directly to the second stage of the turbine through conduit 50. The valve mechanism 46 will therefore be operative to facilitate starting of the power plant since it will be held in an open position diverting flow of exhaust gas to the by-pass conduit 258 at a zero or low speed of the power plant and before any exhaust gas pressure has built-up in the heat exchanger as detected by the pressure sensing device 254. Once the speed of the power plant has increased above a minimum value or the pressure within the heat exchanger has built-up to a sufficient value, the speed sensing device 248 and/or the pressure sensing device 254 will through the linkage 252 move the valve 46 to a position closing off the by-pass conduit 258 and permitting the exhaust gas to be conducted through the conduit 48 to the heat exchanger.

As hereinbefore indicated, condensate emerging from the vapor or steam operated engines 70 and 72 is returned to the hot well 38. The condensate emerging from the condenser 64 associated with the turbine 54 however, may be conducted by conduit 254 to a distilling device 256 within which the condensate is brought into heat exchange relation to the exhaust gases conducted by the conduit 50 through the distilling device 256. Distillates may accordingly be discharged from the distilling device through the outlet 258 while non-recoverable products may be conducted through a condenser 260 for return of remaining condensate to the hot well 38.

Figure 11:
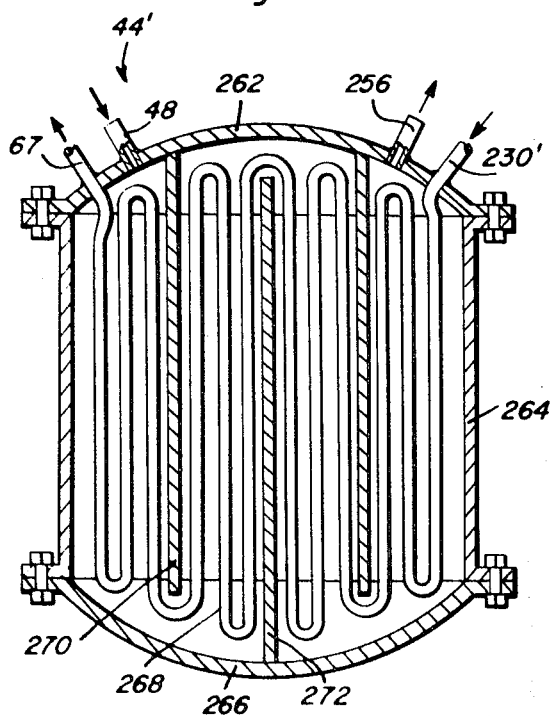
FIG. 11 is an enlarged vertical sectional view of a modified form of heat exchanger which may be used as an alternative to the heat exchanger illustrated in FIG. 2.

FIG. 11 illustrates a monotube heat exchanger 44' which may be used as an alternative to the heat exchanger 44 hereinbefore described. Accordingly, the gas inlet conduit 48 from the gas generator and the gas outlet conduit 256 to the gas turbine 54 are connected to an upper dome portion 262 of the heat exchanger 44' bolted to a cylindrical housing 264 to which a lower dome portion 266 is also bolted. A water inlet conduit 230' and the steam outlet conduit 67 are respectively connected to the upper dome portion adjacent the gas outlet 256 and gas inlet 48. The inlet 230' and outlet 67 are interconnected within the housing by several vertical runs of heat transfer tubing 268 that conducts water and steam in heat exchange relation to hot gases within four chambers partitioned by the two baffles 270 depending from the upper dome and a central baffle 272 extending upwardly from the lower dome. Rapid generation of steam and superheating thereof is achieved as the water and then the steam is conducted to the outlet 67 adjacent the inlet 48 where the gases are hottest. The heat exchanger 44' occupies the same relation to the system as heat exchanger 44 except that a small water pump may be provided to initially feed water directly to the inlet conduit 230' under the external power of a starting motor while a turbine pump driven by output shaft 82 may then take over feed water supply.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a power plant, a multistage turbine having a plurality of turbine stages, fuel combustion means drivingly connected to the turbine for generating combustion products under pressure, a heat exchanger containing a supply of coolant and having conduit means interconnected between the fuel combustion means and the turbine for conducting the combustion products in heat exchange relation to the coolant, to one of the stages of the turbine, means interconnecting the fuel combustion means and the turbine for conducting the combustion products directly to the other stages of the turbine in by-pass relation to the heat exchanger, cooling means operatively mounted on the fuel combustion means, pump means driven by the turbine for supplying coolant to the heat exchanger and the cooling means, means for controllably circulating said coolant between the cooling metns and the heat exchanger when the supply of coolant within the heat exchanger is above a predetermined level, speed responsive control means operatively connected to the fuel combustion means for regulating supply of fuel thereto, means responsive to the pressure of the combustion products in the heat exchanger for regulating the supply of fuel jointly with the speed responsive control means and starting means for diverting the combustion products from the heat exchanger and directly conducting the same to the turbine.

2. The combination of claim 1 including vapor operated engine means drivingly connected to the turbine for increasing the power output thereof, and vapor outlet means connected to the heat exchanger for conducting vaporized coolant therefrom through the vapor operated engine means.

3. The combination of claim 2 wherein the vapor operated engine means includes a reciprocating engine and a reversible turbine through which the vaporized coolant is conducted in series, and braking valve means connected to the reversible turbine for directionally reversing drive thereof.

4. The combination of claim 3 including a power output member drivingly connected to the fuel combustion means, the pump means and the vapor operated engine means, and reversible fluid drive means operatively connecting the multistage turbine to the power output member.

5. The combination of claim 4 wherein the fuel combustion means includes a reciprocating compressor, a continuously movable chamber device periodically charged with fuel and air compressed to an ignition point by the compressor, said chamber device having ports through which the combustion products are sequentially conducted to the stages of the multistage turbine.

6. In a power plant, a multistage turbine having a plurality of turbine stages, fuel combustion means drivingly connected to the turbine for generating combustion products under pressure, a heat exchanger containing a supply of coolant and having conduit means interconnected between the fuel combustion means and the turbine for conducting the combustion products in heat exchange relation to the coolant, to one of the stages of the turbine, and means interconnecting the fuel combustion means and the turbine for conducting the combustion products directly to the other stages of the turbine in by-pass relation to the heat exchanger, said fuel combustion means including a reciprocating compressor, a continuously movable chamber device periodically charged with fuel and air compressed to an ignition point by the compressor, said chamber device having ports through which the combustion products are sequentially conducted to the stages of the multistage turbine.

7. In a power plant, a multistage turbine having a plurality of turbine stages, fuel combustion means drivingly connected to the turbine for generating combustion products under pressure, a heat exchanger containing a supply of coolant and having conduit means interconnected between the fuel combustion means and the turbine for conducting the combustion products in heat exchange relation to the coolant, to one of the stages of the turbine, means interconnecting the fuel combustion means and the turbine for conducting the combustion products directly to the other stages of the turbine in by-pass relation to the heat exchanger, vapor operated engine means drivingly connected to the turbine for increasing the power output thereof, vapor outlet means connected to the heat exchanger for conducting vaporized coolant therefrom through the vapor operated engine means, a power output member drivingly connected to the fuel combustion means and the vapor operated engine means, and reversible fluid drive means operatively connecting the multistage turbine to the power output member.

8. The combination of claim 7 wherein the vapor operated engine means includes a reciprocating engine and a reversible turbine through which the vaporized coolant is conducted in series, and braking valve means connected to the reversible turbine for directionally reversing drive thereof.

9. The combination of claim 7, including cooling means operatively mounted on the fuel combustion means, pump means driven by the turbine for supplying coolant to the heat exchanger and the cooling means, and means for controllably circulating said coolant between the cooling means and the heat exchanger when the supply of coolant within the heat exchanger is above a predetermined level.

10. In a power plant including a gas turbine of the type having at least three stages including an initial stage and a heat exchanger containing a supply of coolant, means responsive to operation of the turbine for generating gas under pressure, conduit means for conducting said gas under pressure to the initial stage of the turbine in heat exchange relation to the coolant through the heat exchanger, control means for diverting said gas from the heat exchanger and directly conducting the same to another one of the stages of the turbine, and means connecting the gas generating means to the turbine for direct supply of gas under pressure to all the stages of the turbine in by-pass relation to the heat exchanger except for said initial stage.

11. The combination of claim 10 including speed responsive means driven by the turbine and means responsive to the pressure of said gas in the heat exchanger for regulating supply of fuel to the gas generating means jointly with the speed responsive means.

12. The combination of claim 10 wherein the gas generating means includes a compressor and a continuously movable chamber device from which the gas from the compressor is sequentially conducted to said stages of the turbine.

13. The combination of claim 12 including speed responsive means driven by the turbine and means responsive to the pressure of said gas in the heat exchanger for regulating supply of fuel to the gas generating means jointly with the speed responsive means.

14. In a power plant, a turbine assembly having at least three stages through which gas sequentially passes, a heat exchanger containing a supply of coolant, conduit means for conducting gas under pressure to at least one of the turbine stages through the heat exchanger in heat exchange relation to the coolant, and means for generating said gas under pressure including a movable chamber device drivingly connected to the turbine assembly for sequentially supplying the gas directly from the generating means to each of said conduit means and the other turbine stages.

15. The combination of claim 14 including speed responsive means driven by the turbine and means responsive to the pressure of said gas in the heat exchanger for regulating supply of fuel to the gas generating means jointly with the speed responsive means.

References Cited

UNITED STATES PATENTS

| | | | |
|---|---|---|---|
| 2,357,041 | 8/1944 | Woolley | 60—39.18B |
| 2,605,610 | 8/1952 | Hermitte et al. | 60—39.18B |
| 2,613,495 | 10/1952 | Mercier et al. | 60—39.18B |
| 2,663,144 | 12/1953 | Nordstrom et al. | 60—39.18B |
| 2,663,145 | 12/1953 | Waeselynck | 60—39.18B |

FOREIGN PATENTS

| | | | |
|---|---|---|---|
| 152,872 | 10/1920 | Great Britain | 60—39.18B |
| 116,431 | 5/1925 | Switzerland | 60—39.18B |

MARK M. NEWMAN, Primary Examiner

U.S. Cl. X.R.

60—39.34, 39.81